(12) United States Patent
Wu et al.

(10) Patent No.: US 10,645,448 B2
(45) Date of Patent: May 5, 2020

(54) BUFFER-AWARE TRANSMISSION RATE CONTROL FOR REAL-TIME VIDEO STREAMING SYSTEM

(71) Applicant: OMNIVISION TECHNOLOGIES, INC., Santa Clara, CA (US)

(72) Inventors: Jiyan Wu, Singapore (SG); Zhizhuan Wen, Shanghai (CN); Jun Wei, Singapore (SG); Hui Pan, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 73 days.

(21) Appl. No.: 15/595,746

(22) Filed: May 15, 2017

(65) Prior Publication Data

US 2018/0332342 A1 Nov. 15, 2018

(51) Int. Cl.
*H04W 24/08* (2009.01)
*H04N 21/44* (2011.01)
(Continued)

(52) U.S. Cl.
CPC ..... *H04N 21/44004* (2013.01); *H04L 1/1825* (2013.01); *H04L 1/1877* (2013.01);
(Continued)

(58) Field of Classification Search
None
See application file for complete search history.

(56) References Cited

U.S. PATENT DOCUMENTS 6,608,818 B1 * 8/2003 Abrol .................... H04L 1/1809
370/252
7,411,901 B1 * 8/2008 Alexander .............. H04L 47/10
370/230
(Continued)

OTHER PUBLICATIONS

Handley et al., "TCP Friendly Rate Control (TFRC): Protocol Specification" Internet Engineering Task Force, 2003 (24 pages).
Akhshabi et al., "An Experimental Evaluation of Rate-Adaptation Algorithms in Adaptive Streaming over HTTP" Proc. of ACM MMSys., 2011 (12 pages).
Huang et al., "Confused, Timid, and Unstable: Picking a Video Streaming Rate is Hard" Proc. of ACM IMC., 2012 (14 pages).
(Continued)

*Primary Examiner* — Hsiungfei Peng
*Assistant Examiner* — Terrika Peterson
(74) *Attorney, Agent, or Firm* — Christensen O'Connor Johnson Kindness PLLC (57) ABSTRACT

Systems and methods for buffer-aware transmission rate control for real-time video streaming are disclosed herein. An example method includes transmitting a first video packet at a transmission rate based on a buffer fill ratio of a buffer, where the transmission rate is adjusted in response to changes of the buffer fill ratio, selectively retransmitting a second video packet in response to a negative acknowledgement packet, where selectively retransmitting the second video packet is at least based on whether the second video packet has been previously retransmitted, a buffer level of the buffer, and a retransmission rate, and selectively retransmitting a third video packet in response to a non-receipt of an acknowledgement packet within a retransmission timeout, wherein selectively retransmitting the third video packet is at least based on whether the third video packet has been previously retransmitted, the buffer level of the buffer, and the retransmission rate.

18 Claims, 4 Drawing Sheets

(51) Int. Cl.

| | | |
|---|---|---|
| H04N 21/6375 | (2011.01) | |
| H04L 1/18 | (2006.01) | |
| H04N 21/4363 | (2011.01) | |
| H04N 21/61 | (2011.01) | |
| H04N 21/436 | (2011.01) | |
| H04N 21/63 | (2011.01) | |
| H04W 28/02 | (2009.01) | |

(52) U.S. Cl.
CPC ..... H04L 1/1883 (2013.01); H04N 21/43615 (2013.01); H04N 21/43637 (2013.01); H04N 21/6131 (2013.01); H04N 21/632 (2013.01); H04N 21/6375 (2013.01)

(56) References Cited

U.S. PATENT DOCUMENTS

| | | | | |
|---|---|---|---|---|
| 9,307,441 | B1* | 4/2016 | Vivanco | H04W 28/0231 |
| 2001/0034209 | A1* | 10/2001 | Tong | H04L 1/0002 |
| | | | | 455/69 |
| 2003/0231594 | A1* | 12/2003 | Xu | H04L 1/1877 |
| | | | | 370/236 |
| 2004/0257995 | A1* | 12/2004 | Sandy | H04L 47/10 |
| | | | | 370/235 |
| 2010/0074113 | A1* | 3/2010 | Muramoto | H04L 43/0864 |
| | | | | 370/235 |
| 2010/0158032 | A1* | 6/2010 | Carlsson | H04L 47/10 |
| | | | | 370/412 |
| 2011/0310911 | A1* | 12/2011 | Froehler | H04L 1/1812 |
| | | | | 370/465 |
| 2013/0028088 | A1* | 1/2013 | Do | H04L 1/0002 |
| | | | | 370/235 |
| 2014/0198643 | A1* | 7/2014 | Conway | H04W 24/08 |
| | | | | 370/230 |
| 2014/0233403 | A1* | 8/2014 | Kreuchauf | H04L 1/0002 |
| | | | | 370/252 |

OTHER PUBLICATIONS

Zhang et al., "Profiling Skype Video Calls: Rate Control and Video Quality" Proc. of IEEE INFOCOM, 2012 (9 pages).

Li et al., "Probe and Adapt: Rate Adaptation for HTTP Video Streaming At Scale" IEEE Journal on Selected Areas in Communications, 2014 (32(4): 719-733).

Wu et al., "Leveraging the Delay-Friendliness of TCP With FEC Coding in Real-Time Video Communication" IEEE Transactions on Communications, 2015 (63(10): 3584-3599).

Wu et al., "Trading Delay for Distortion in One-Way Video Communication Over the Internet" IEEE Transactions on Circuits and Systems for Video Technology, 2016 (26(4): 711-723).

Ahmad et al., "Adaptive Unicast Video Streaming with Rateless Codes and Feedback," IEEE Transactions on Circuits and Systems for Video Technology, vol. 20, No. 2, Feb. 2010, 13 pages.

Xiao et al., "Dynamic Sub-GOP Forward Error Correction Code for Real-Time Video Applications," IEEE Transactions on Multimedia, vol. 14, No. 4, Aug. 2012, 12 pages.

Tournoux et al., "On-the-fly erasure coding for real-time video applications," IEEE Transactions on Multimedia, vol. 13, No. 4, 16 pages.

Wu et al., "Content-Aware Concurrent Multipath Transfer for High-Definition Video Streaming over Heterogeneous Wireless Networks," IEEE Transactions on Parallel and Distributed Systems, vol. 27, No. 3, Mar. 2016, 14 pages.

Wu et al., "Cross-Layer Forward Error Correction Scheme Using Raptor and RCPC Codes for Prioritized Video Transmission Over Wireless Channels," IEEE Transactions on Circuits and Systems for Video Technology, vol. 24, No. 6, Jun. 2014, 14 pages.

Wu et al., "Delay-Constrained High Definition Video Transmission in Heterogeneous Wireless Networks with Multi-Homed Terminals," IEEE Transactions on Mobile Computing, vol. 15, No. 3, Mar. 2016, 15 pages.

Sgardoni et al., "Raptor Code-Aware Link Adaptation for Spectrally Efficient Unicast Video Streaming over Mobile Broadband Networks," IEEE Transactions on Mobile Computing, vol. 14, No. 2, Feb. 2015, 15 pages.

* cited by examiner

BUFFER-AWARE TRANSMISSION RATE CONTROL FOR REAL-TIME VIDEO STREAMING SYSTEM

TECHNICAL FIELD

This disclosure relates generally to video transmission systems, and in particular but not exclusively, relates to real-time video communication systems.

BACKGROUND INFORMATION

Real-time video transmission over unreliable communication networks may incur various image quality problems, e.g., missing or distorted frames, freezing, stalls, interruptions, etc. These issues may be caused by the bandwidth fluctuations, inadequate bandwidth, packet losses, and/or sender-side or receiver-side buffer underflow/overflow. For example, if the instantaneous transmission rate of a sending device is larger than the available network bandwidth, many packets may arrive at the destination out of a deadline, which induces quality degradation. Furthermore, in the case of long-distance transmissions, the bandwidth consumption may be increased, which results in unnecessary packet retransmissions. Besides, the buffer underflow/overflow may result from abnormal transmission rates, and may affect the quality of the video. While many attempts to mitigate such issues have been proposed over the years, an efficient solution has yet to materialize. Accordingly, a real-time transmission rate and scheduling scheme may be desired to address such issues.

BRIEF DESCRIPTION OF THE DRAWINGS

Non-limiting and non-exhaustive examples of the invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Examples of an apparatus and method for real-time video transmission system that adjusts a transmission rate based on a fill level of a sender-side buffer, and further reduces bandwidth consumption based on various retransmission schemes are described herein. In the following description, numerous specific details are set forth to provide a thorough understanding of the examples. One skilled in the relevant art will recognize; however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

Figure 1:
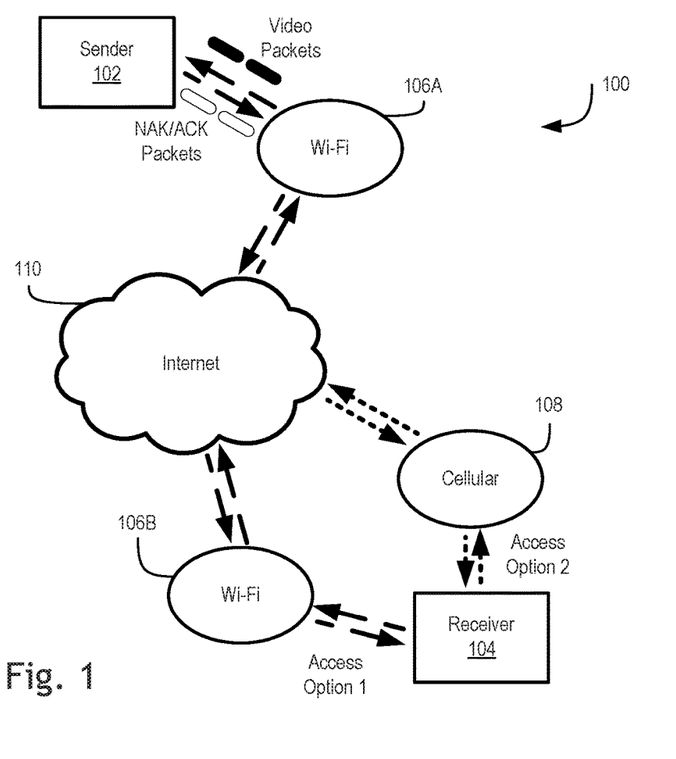
FIG. 1 is an example video transmission system in accordance with an embodiment of the present disclosure.

FIG. 1 is an example video transmission system 100 in accordance with an embodiment of the present disclosure. The video transmission system 100 (system 100 for short) may provide real-time video from sender 102 to receiver 104. The system 100 may implement transmission rate control to achieve quality video using minimum bandwidth. In some embodiments, the system 100 may adjust the transmission rate based, at least in part, on a fill percentage of a buffer of the sender 102. Additionally, the system 100 may implement one or more retransmission schemes to limit the retransmission of packets in a manner that does not adversely impact the bandwidth usage. The retransmission schemes may be an acknowledgement-based, e.g., timeout-based, retransmission rate control scheme and/or a negative acknowledgement-based selective retransmission scheme. In some embodiments, both retransmission schemes will be simultaneously implemented. In other embodiments, the retransmission scheme implemented may depend on a distance between the sender and the receiver. The system 100, for example, may be implemented by applications that provide real-time video, such as point-to-point systems that provide video from a remote camera to a viewer via a wired and/or wireless communication system. The communication system may include the internet, wi-fi, and/or cellular transmission media.

The illustrated embodiment of the system 100 includes the sender 102, the receiver 104, two or more wi-fi points 106, a cellular network point 108, and the internet 110. The sender 102 may transmit video packets to the receiver 104. The video packets may propagate through various paths from the sender 102 to the receiver 104. For example, the video packets may first be provided to wi-fi point 106A before propagating to and through the internet 110. As the video packets exit the internet on their way to the receiver 104, the video packets may go through the wi-fi point 106B or the cellular network (e.g., LTE, HSDPA, 3G, etc.) point 108. In some embodiments, the cellular network point 108 is 4G LTE based protocol. In response to the video packets, the receiver 104 may transmit an acknowledgement (ACK) packet and/or negative acknowledgement (NAK) packet to the sender 102. Based on the receipt or non-receipt of the NAK and ACK packets, respectively, the sender 102 may retransmit the video packets.

The NAK packets inform the sender 102 that a specific video packet was not received, which the receiver 104 may determine from the received packets. More specifically, each video packet may have a unique identifier, e.g., a sequence number, which is embedded in the video packet header. The sequence number may be a sequential, e.g., a linked list, that allows the receiver 104 to quickly determine if there are any missing video packets by reviewing the sequence numbers of the received video packets. Any missing numbers would indicate a lost video packet. In some embodiments, the receiver 104 may temporarily store the video packets in a buffer. Thus, as the video packets are received by the receiver 104, the receiver 104 may order the video packets based on their sequence numbers (the video packets may be received out of order in some instances), and further review the sequence for missing sequence numbers. In response, the receiver 104 may transmit a NAK packet requesting the retransmission of a missing video packet based on a missing sequence number.

In some embodiments, the sequence numbers may be reset for each video frame. For example, an intra-encoded frame, e.g., an i (intra)-frame, may be encoded into a large number of packets, and the packets for the i-frame may be sequentially numbered from zero to 255, for example. Once the i-frame has been successfully transmitted and any lost packets retransmitted, the next frame may be ready for transmission at which time the sequence numbers may be reset and started over.

The ACK packets may be provided by the receiver 104 in response to each received video packet. In response to receipt of an ACK packet, the sender 102 may remove that identified video packet, based on the sequence number, from a buffer of the sender 102. Additionally, for each video packet in the sender buffer, a timer may be started on transmission of the video packet, where the timer sets an amount of time, e.g., a timeout period, an ACK packet is expected to be received from the receiver 104. An example timeout period is 500 milliseconds. If the sender 102 does not receive an ACK packet for a specific video packet within its associated timeout, then the sender 102 may retransmit the specific video packet.

In response to the NAK packets or in response to a non-receipt of an ACK packet the sender 102 may determine when or if to retransmit the video packet. The sender 102 may evaluate whether the video packet has previously been retransmitted, how many NAK packets or non-receipt of ACK packets have occurred for the specific video packet, a state of a buffer fullness level, and/or a retransmission level before determining whether to retransmit the video packet. By evaluating these various factors, the sender 102 may regulate the retransmission rate in a way that does not adversely affect the bandwidth usage during the real-time video transmission.

Figure 2:
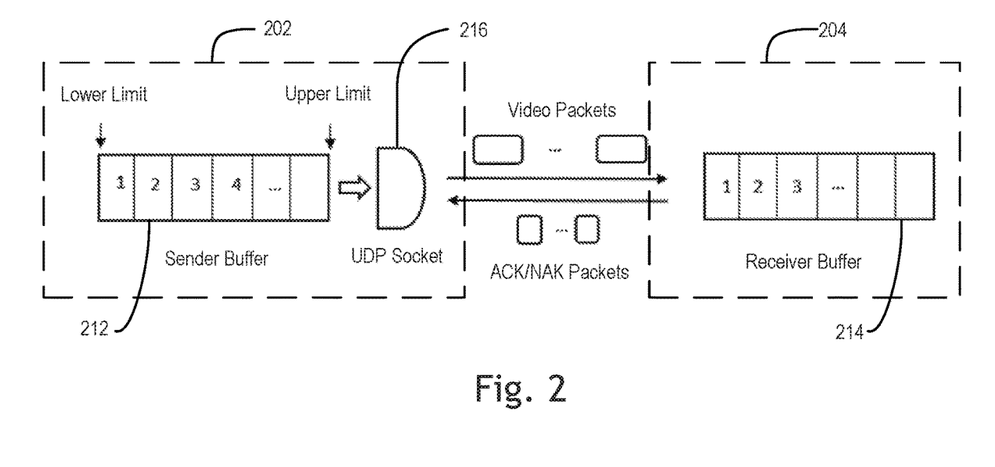
FIG. 2 is an example illustration of a sender and a receiver in accordance with an embodiment of the present disclosure.

FIG. 2 is an example illustration of a sender 202 and a receiver 204 in accordance with an embodiment of the present disclosure. The sender 202 and the receiver 204 may be but one example of the sender 102 and the receiver 104, respectively. The illustrated embodiment of the sender 202 includes a sender buffer 212 and a user datagram protocol (UDP) socket 216. The illustrated embodiment of the receiver 204 includes a receiver buffer 214. While the sender 202 and the receiver 204 may include other hardware for transmitting and receiving packets, such as video encoders, decoders, mac layers, physical layers, radios, and controllers, such known features are not shown for ease and clarity of discussion. The discussion of FIG. 2 may be used to further illustrate system 100.

The sender buffer 212 and the receiver buffer 214 may be similar in size. For example, the sender buffer 212 and the receiver buffer 214 may both be able to hold 64 video packets. Each video packet may be 1024 Bytes in length and include at least a header and a payload section. The header may include information about the payload and various identifying information for the video packet. In some embodiments, the header includes the sequence number of the video packet, which may be used by the sender 202 and the receiver 202 in implementing ACK and NAK based retransmission schemes.

The UDP socket 216 may be used to transmit the video packets and ACK/NAK packets using UDP. While a UDP socket is not shown in the receiver 204, a UDP socket is included. The UDP socket 216 may provide connectionless transmission of the video, ACK, and NAK packets between the sender 202 and the receiver 204.

The system 100, using the sender 102/202 and the receiver 104/204, may implement a transmission rate control and the two retransmission schemes for the transmission of real-time video using the UDP socket/protocol. In general, the video frame data is continuously pushed to the sender buffer 212 and sent to the receiver 204 via the UDP socket 216. In an attempt to guarantee reliable video data delivery, the NAK and ACK based retransmission schemes are implemented by the system 100. Accordingly, if an ACK packet of a specific video packet in the buffer 212 is not received by the sender 102/202 within the timeout, then the video packet may be retransmitted if not previously retransmitted, else the sender 102/202 may perform an ACK-specific algorithm to determine if the video packet should be retransmitted, at least at that time. Additionally, if the NAK packet of a specific video packet is received by the sender 102/202, then the sender may perform an NAK-specific algorithm to determine if the video packet should be retransmitted, at least at that time.

The sender 102/202 may determine an instantaneous transmission rate for delivering the video packets, which may be adjusted to prevent or limit overflow of the sender buffer 212. Additionally, the transmission rate may be adjusted to be network friendly, e.g., to conform to network established bounds. In general, the transmission rate may be adjusted based on a fullness level of the sender buffer 212. For example, the transmission rate R may be (number of buffered video packets/maximum buffer size)* $R_{network}$, wherein $R_{network}$ is as observed throughput for TCP protocol, which is also applicable to UDP protocol. In some embodiments, $R_{network}$ is as follows:

$$R_{network} = \frac{S}{RTT * \sqrt{\frac{2}{3} * p} + \left(RTO * \left(3 * \sqrt{\frac{3}{8} * p}\right) * p * (1 + 32 * p^2)\right)},$$

where S is the packet size, RTT is the round trip time from sender to receiver, RTO is the retransmission timeout, and p is the packet loss rate. While the standard transmission rate, $R_{network}$, does not consider the sender side buffer, the transmission rate of the present disclosure adjusts the transmission rate based on the fullness level of the sender side buffer, which may have an effect of improving user-perceived quality while minimizing bandwidth consumption. The transmission rate R may be used by the sender 102/202 in transmitting the video packets that are newly provided to the sender buffer 212 to the receiver 104, but may not affect the retransmission rate of the system 100. Instead, the NAK and ACK based retransmission schemes may affect the retransmission rate, and will be discussed in further detail below.

Figure 3:
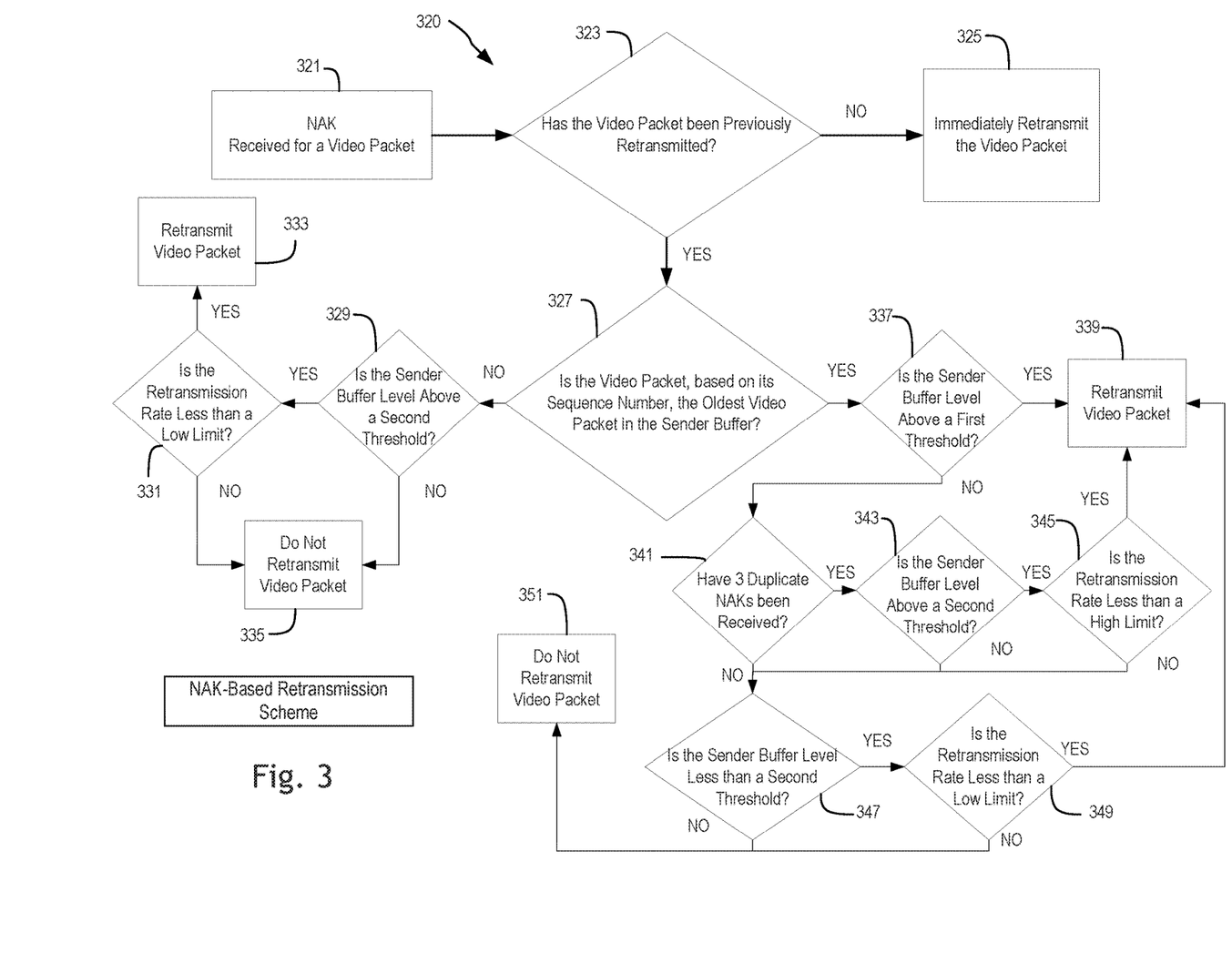
FIG. 3 is an example NAK-based video packet retransmission algorithm in accordance with an embodiment of the present disclosure.

FIG. 3 is an example NAK-based video packet retransmission algorithm 320 in accordance with an embodiment of the present disclosure. The algorithm 320 may be an example of a negative acknowledgement selective retransmission scheme implemented by the sender 102 and/or 202 as included in the system 100, for example. The sender may receive a NAK packet from a receiver, such as the receiver 104 and/or 204. The algorithm 320, as implemented by the sender, may determine what video packets to retransmit and when based on receipt of the associated NAK packet, where the NAK packet identifies the video packet using a video packet identifier, such as a sequence number.

The algorithm 320 may begin at process block 321, which includes receiving a NAK packet for a specific video packet as identified by the sequence number. The NAK packet is received by the sender for a video packet the sender has previously transmitted to the receiver. The process block 321 may be followed by process block 323, which determines whether the video packet has previously been retransmitted. In some embodiments, the sender may determine if the video packet has been previously retransmitted based on a counter that tracks a number of retransmissions for each video packet using their associated sequence number. For example, the sender may consult the counter to determine if the video packet has been previously retransmitted. If the video packet has yet to be retransmitted, then the algorithm 320 proceeds to process block 325 and the video packet is immediately retransmitted. If, however, the video packet has already been retransmitted, then the algorithm 320 proceeds to process block 327, which determines whether the video packet, based on its sequence number, is the oldest video packet in a sender buffer, such as the sender buffer 212. The oldest packet may also be referred to as the lower bound of the sender buffer, e.g., the lowest sequence number in the sender buffer.

If the video packet identified by the NAK packet is the oldest video packet in the sender buffer, then the algorithm proceeds to process block 337. Process block 337 determines whether the sender buffer is above a threshold level, e.g., becoming full. The threshold level may also be referred to as a first threshold. In some embodiments, the threshold level may be the maximum buffer size minus a value, such as 10. In some embodiments, the threshold level is 80%, but it could be as high as 85%. If the sender buffer is above the threshold level, then the algorithm 320 proceeds to process block 339, which includes retransmitting the video packet. If, however, the sender buffer is less than the threshold level, then the algorithm 320 proceeds to process block 341.

If the video packet identified by the NAK packet is not the oldest video packet in the sender buffer as determined by process block 327, then the algorithm 320 proceeds to process block 329. Process block 329 determines whether a fullness level of the sender buffer is above a high level, e.g., a second threshold. The high level, or second threshold, may be 60% of the sender buffer capacity, for example. If the sender buffer level is above the high level, then the algorithm 320 proceeds to the process block 331. However, if the sender buffer level is less than the high level, then the algorithm 320 proceeds to process block 335, which includes not retransmitting the video packet.

The process block 331 includes determining whether the retransmission rate is less than a low limit. The low limit may be based on a low limit multiplier multiplied by a ratio of a number of buffered packets in the sender buffer to a total number of sent packets. For example, the low limit can be defined as lower_rate_limit*(number of buffered video packets/total sent video packets), where an example lower_rate_limit is 0.15. If the retransmission rate is less than the low limit, then the algorithm 320 proceeds to process block 333, which includes retransmitting the video packet, else the algorithm proceeds to process block 335.

Returning to the right side of FIG. 3, the algorithm 320 proceeds to process block 341 if the sender buffer level is not above the threshold level, e.g., it is not becoming full. The process block 341 determines whether three duplicate NAK packets have been received by the sender. For example, whether three NAK packets for the same video packet have been received. If three duplicate NAK packets have been received, then the algorithm 320 proceeds to process block 343, which determines whether the sender buffer level is above the high level, e.g., above 60% full. If three duplicate NAK packets have not been received, then the algorithm 320 proceeds to process block 347. If the determination made by process block 343 is YES, e.g., that the sender buffer is above the high level, then the algorithm proceeds to process block 345, else the algorithm proceeds to process block 347.

The process block 345 makes an additional determination of whether the retransmission rate is less than a high limit. The high limit may be based on a high limit multiplier multiplied by a ratio of a number of retransmitted video packets to a total number of sent video packets. For example, the high limit may be defined as higher_rate_limit*(number of retransmitted video packets/total number of sent video packets), where an example higher_rate_limit is 0.35. If the retransmission rate is less than the high limit, then the algorithm 320 proceeds to process block 339, and retransmits the video packet. However, if the retransmission rate is not less than the high limit, then the algorithm 320 proceeds to the process block 347.

Process block 347 determines whether the sender buffer level is less than the high level, e.g., the second threshold. If not, then the algorithm proceeds to process block 351, which includes not retransmitting the video packet. If, however, the sender buffer level is less than the high level, then the algorithm proceeds to process block 349, which determines whether the retransmission rate is less than the low limit. If so, then the algorithm proceeds to process block 339, and the video packet is retransmitted, else the algorithm proceeds to process block 351.

The algorithm 320 may allow the sender to selectively retransmit video packets in a manner that may limit unnecessary retransmissions and bandwidth consumption. The selectivity of the algorithm 320 may allow the receiver time to reorganize video packets received out of order and to allow video packets that take a different path from sender to receiver to be accounted for before unnecessarily retransmitting the video packets.

Figure 4:
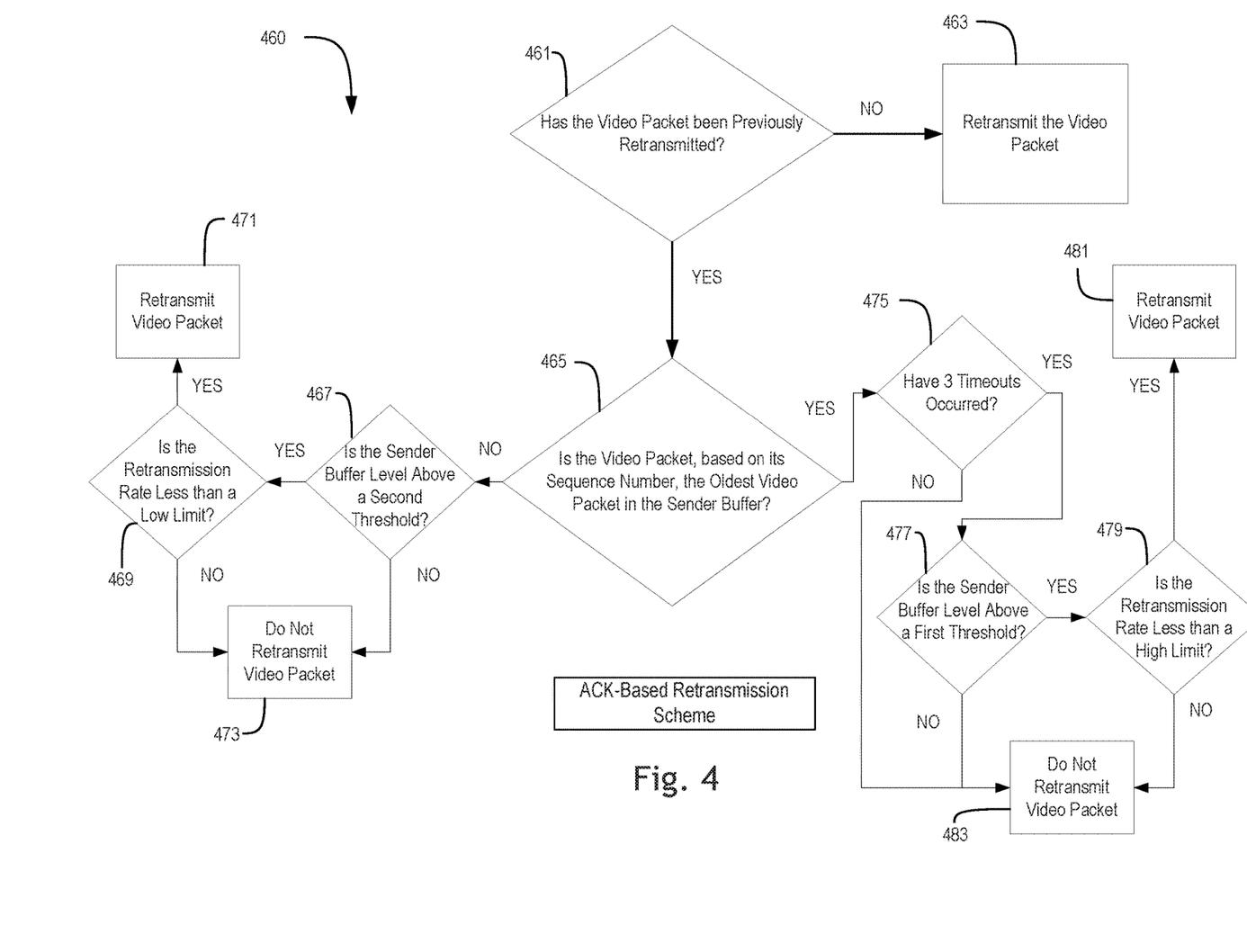
FIG. 4 is an example ACK-based video packet retransmission algorithm in accordance with an embodiment of the present disclosure.

FIG. 4 is an example ACK-based video packet retransmission algorithm 460 in accordance with an embodiment of the present disclosure. The algorithm 460 may be an example of an acknowledgement, e.g., timeout, retransmission scheme implemented by the sender 102 and/or 202 as included in the system 100, for example. The sender may not receive an ACK packet from a receiver, such as the receiver 104 and/or 204. The algorithm 460, as implemented by the sender, may determine what video packets to retransmit and when based on non-receipt of the ACK packet. In the ACK-based retransmission scheme the sender may be expecting an ACK packet from the receiver before removing the video packet from the sender buffer. As part of this determination, the sender may associate a timeout for each video packet in which the sender expects to receive an ACK packet within the timeout. An example timeout may be 500 milliseconds. If an ACK packet is not received within the timeout, then the sender may perform the algorithm 460 to determine if the video packet should be transmitted.

The algorithm 460 may begin at process block 461, which determines whether a video packet associated with a timeout, e.g., a non-receipt of an associated ACK packet, has previously been retransmitted. If not, then the video packet may be immediately retransmitted by process block 463. If the video packet has been previously retransmitted, then the algorithm proceeds to process block 465. Process block 465 makes a further determination of whether the video packet, based on its sequence number, is the earliest video packet in the sender buffer, e.g., is it the lower bound of the sender buffer. If yes, then the algorithm proceeds to process block 475, else the algorithm proceeds to process block 467.

Process block 467 determines whether a fullness level of the sender buffer is above a high level, e.g., above a second threshold. The high level, or second threshold, may be 60% full, for example. If the sender buffer level is above the second threshold, then the algorithm proceeds to the process block 469. However, if the sender buffer level is less than the second threshold, then the algorithm proceeds to process block 473, which includes not retransmitting the video packet. The process block 469 includes determining whether the retransmission rate is less than a low limit. The low limit may be based on a low limit multiplier multiplied by a ratio of a number of buffered packets in the sender buffer to a total number of sent packets. For example, the low limit is lower_rate_limit*(number of buffered video packets/total sent video packets), where an example lower_rate_limit is 0.15. If the retransmission rate is less than the low limit, then the algorithm proceeds to process block 471, which includes retransmitting the video packet, else the algorithm proceeds to process block 473.

Referring back to the right side of FIG. 4, if the video packet, based on its sequence number, is the earliest video packet in the sender buffer, then the algorithm proceeds to process block 475, which determines whether three timeouts have occurred for the video packet. A timeout, as noted, is when an ACK is not received within the associated timeout. If three timeouts have not occurred, then the algorithm proceeds to process block 483, which includes do not retransmit the video packet. If, however, three timeouts have occurred, then the algorithm proceeds to process block 477. Process block 477 determines whether the sender buffer level is above a first threshold, e.g., 80%, and proceeds to process block 479 if YES, else the algorithm proceeds to process block 483.

Process block 479 makes a further determination of whether the retransmission rate is less than a high limit. The high limit may be based on a high limit multiplier multiplied by a ratio of a number of retransmitted video packets to a total number of sent video packets. For example, the high limit is higher_rate_limit*(number of retransmitted video packets/total number of sent video packets), where an example higher_rate_limit is 0.35. If the retransmission rate is less than the high limit, then the algorithm proceeds to process block 481, and retransmits the video packet. However, if the retransmission rate is not less than the high limit, then the algorithm proceeds to the process block 483.

The sender may simultaneously implement both the NAK-based and the ACK-based retransmission schemes. As such, the sender may set timers for each video packet, and respond to any timeouts accordingly, but may also except to receive ACK and NAK packets for delivered and undelivered video packets. As such, for each video packet, the sender may retransmit a packet if either a NAK packet is received or if an ACK packet is not received, in accordance with the above discussed ACK and NAK algorithms.

Figure 5:
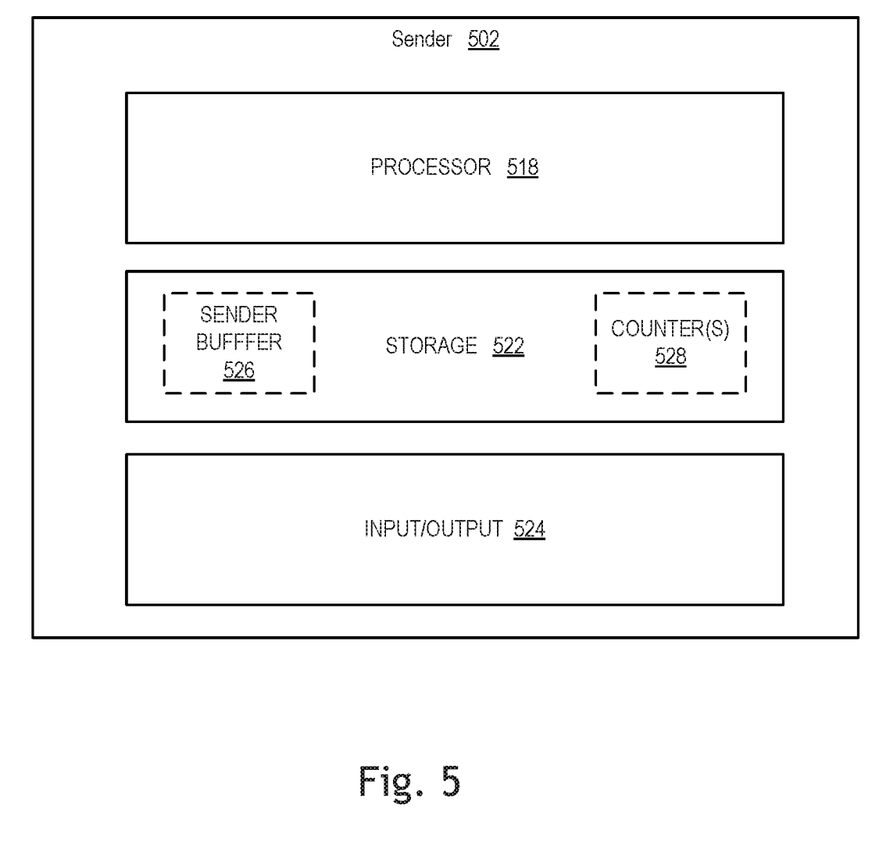
FIG. 5 is a functional block diagram of a sender in accordance with an embodiment of the present disclosure.

FIG. 5 is a functional block diagram of a sender 502 in accordance with an embodiment of the present disclosure. The sender 502 may be an example of the senders 102 and/or 202. The sender 502 may be implemented in hardware, software, firmware, or combinations thereof, and may implement transmission rate control and algorithms 320 and 460 as disclosed herein. In some embodiments, the sender 502 may transmit, in real time, video packets to a receiver, such as the receiver 104 and/or 204. In response, the receiver may provide NAK and ACK packets in response to the video packets.

The illustrated embodiment of the sender 502 includes a processor 518, storage 522, and input/output 524. The processor 518 may be a general purpose processor, a microcontroller, or an application specific integrated circuit. In some embodiments, the processor 518 may control the transmission and retransmission of video packets from the sender 502 through execution of code stored in the storage 522. The code may include instructions for transmitting the video packets using the transmission rate discussed above, and also includes instructions for implementing the ACK and NAK based retransmission schemes as illustrated by algorithms 320 and 460. The processor 518 may transmit the video packets and receive the ACK and NAK packets via the input/output 524.

The storage 522, which may be volatile or non-volatile storage, may include sender buffer 526 and counter(s) 528. The sender buffer 526 may be a partitioned area of the storage 522 and be large enough to temporarily store up to 64 video packets. The counter(s) 528, likewise, may be an area of the storage 522, and may be used to track the numbers of times video packets are retransmitted. Additionally, the counter(s) 528 may also be used to establish timeout timers for the video packet and count the numbers of times they are run through without receiving associated ACK packets.

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. A method comprising:
   transmitting a first video packet from a sender at a transmission rate based, at least in part, on a buffer fill ratio of a buffer included in the sender, wherein the transmission rate is adjusted in response to changes of the buffer fill ratio;

selectively retransmitting a second video packet from the sender in response to a negative acknowledgement (NAK) packet, wherein selectively retransmitting the second video packet is at least based on whether the second video packet has been previously retransmitted, a buffer level of the buffer, reception of duplicate NAK packets, and a retransmission rate, and wherein selectively retransmitting the second video packet in response to the NAK packet includes:
  determining whether the second video packet has been previously retransmitted;
  determining whether the second video packet is an oldest video packet in the buffer of the sender in response to determining the second video packet has been previously retransmitted;
  determining whether the buffer level is above a first threshold in response to determining the second video packet is the oldest video packet in the buffer of the sender;
  determining whether three duplicate NAK packets included in the duplicate NAK packets have been received for the second video packet in response to the buffer level not being above the first threshold;
  determining whether the buffer level is above a second threshold higher than the first threshold in response to the three duplicate NAK packets having been received for the second video packet;
  determining whether the retransmission rate is less than a high limit in response to the buffer level being above the second threshold; and
  retransmitting the second video packet when collectively the second video packet has been previously retransmitted, the second video packet is the oldest video packet in the buffer of the sender, the buffer of the sender is not above the first threshold, the three duplicate NAK packets have been received, the buffer level is above the second threshold, and the retransmission rate is less than the high limit; and
selectively retransmitting a third video packet from the sender in response to a non-receipt of an acknowledgement (ACK) packet within a retransmission timeout, wherein selectively retransmitting the third video packet is at least based on whether the third video packet has been previously retransmitted, the buffer level of the buffer, and the retransmission rate.

2. The method of claim 1, wherein the buffer fill ratio is determined based on a number of buffered packets divided by a maximum buffer size.

3. The method of claim 1, wherein the transmission rate is further determined based on a network transmission rate, wherein the network transmission rate is affected by a packet size, a round trip time, the retransmission timeout, and a packet loss rate.

4. The method of claim 1, wherein selectively retransmitting the second video packet in response to the NAK packet includes:
  determining whether the second video packet has been previously retransmitted; and
  based on the second video packet not having been previously retransmitted, retransmitting the second video packet.

5. The method of claim 1, further comprising:
  based on not having received the three duplicate NAK packets, the buffer level not being above the second threshold, or the retransmission rate not being less than the high limit, determining whether the buffer level is less than the second threshold;
  based on the buffer level being less than the second threshold, determining whether the retransmission rate is less than a low limit;
  based on the retransmission rate being less than the low limit, retransmitting the second video packet.

6. The method of claim 1, further comprising:
  based on the second video packet not being the oldest video packet in the buffer, determining whether the buffer level is above the second threshold;
  based on the buffer level being above the second threshold, determining whether the retransmission rate is less than a low limit; and
  based on the retransmission rate being less than the low limit, retransmitting the second video packet.

7. The method of claim 1, wherein selectively retransmitting the third video packet in response to the non-receipt of the ACK packet within the retransmission timeout comprises:
  determining whether the third video packet has been previously retransmitted;
  based on the third video packet not having been previously retransmitted, retransmitting the third video packet; and
  based on the third video packet having been previously retransmitted, determining whether the third video packet is the oldest video packet in the buffer of the sender.

8. The method of claim 7, further comprising:
  based on the third video packet not being the oldest video packet in the buffer, determining whether the buffer level is above the second threshold;
  based on the buffer level being above the second threshold, determining whether the retransmission rate is less than a low limit; and
  based on the retransmission rate being less than the low limit, retransmitting the second video packet.

9. The method of claim 7, further comprising:
  based on the third video packet being the oldest video packet in the buffer of the sender, determining whether three retransmission timeouts have occurred for the third video packet;
  based on the three retransmission timeouts having occurred, determining whether the buffer is above a first threshold;
  based on the buffer being above the first threshold, determining whether the retransmission rate is less than the high limit; and
  based on the retransmission rate being less than the high limit, retransmitting the third video packet.

10. The method of claim 1, wherein the first threshold is 80% of a maximum size of the buffer of the sender.

11. A non-transitory, computer readable storage medium (CRM) including instructions that, when executed by a processor, cause the processor to:
  transmit a first video packet from a sender at a transmission rate based, at least in part, on a buffer fill ratio of a buffer included in the sender, wherein the transmission rate is adjusted in response to changes of the buffer fill ratio;
  selectively retransmit a second video packet from the sender in response to a negative acknowledgement (NAK) packet, wherein selectively retransmitting the second video packet is at least based on whether the second video packet has been previously retransmitted, a buffer level of the buffer, reception of duplicate NAK packets, and a retransmission rate, and wherein to selectively retransmit the second video packet in response to the NAK packet includes:
  determine whether the second video packet has been previously retransmitted;
  determine whether the second video packet is an oldest video packet in the buffer of the sender in response to determining the second video packet has been previously retransmitted;
  determine whether the buffer level is above a first threshold in response to determining the second video packet is the oldest video packet in the buffer of the sender;
  determine whether three duplicate NAK packets included in the duplicate NAK packets have been received for the second video packet in response to the buffer level not being above the first threshold;
  determine whether the buffer level is above a second threshold lower than the first threshold in response to the three duplicate NAK packets having been received for the second video packet;
  determine whether the retransmission rate is less than a high limit in response to the buffer level being above the second threshold; and
  retransmit the second video packet when collectively the second video packet has been previously retransmitted, the second video packet is the oldest video packet in the buffer of the sender, the buffer of the sender is not above the first threshold, the three duplicate NAK packets have been received, the buffer level is above the second threshold, and the retransmission rate is less than the high limit; and
selectively retransmit a third video packet from the sender in response to a non-receipt of an acknowledgement (ACK) packet within a retransmission timeout, wherein selectively retransmitting the third video packet is at least based on whether the third video packet has been previously retransmitted, the buffer level of the buffer, and the retransmission rate.

12. The CRM of claim 11, wherein the buffer fill ratio is determined based on a number of buffered packets divided by a maximum buffer size; and
  wherein the transmission rate is further determined based on a network transmission rate, wherein the network transmission rate is affected by a packet size, a round trip time, the retransmission timeout, and a packet loss rate.

13. The CRM of claim 11, wherein the instructions that cause the processor to selectively retransmit the second video packet in response to the NAK packet, further includes instructions that cause the processor to:
  based on the second video packet not having been previously retransmitted, retransmit the second video packet.

14. The CRM of claim 11, further including instructions that, when executed by the processor, cause the processor to:
  based on the three duplicate NAK packets not being received for the second video packet, the buffer level not being above the second threshold, or the retransmission rate not being less than the high limit, determine whether the buffer level is less than the second threshold;
  based on the buffer level being less than the second threshold, determine whether the retransmission rate is less than a low limit; and
  based on the retransmission rate being less than the low limit, retransmit the second video packet.

15. The CRM of claim 13, further including instructions that, when executed by the processor, cause the processor to:
  based on the second video packet not being the oldest in the buffer, determine whether the buffer level is above the second threshold;
  based on the buffer level being above the second threshold, determine whether the retransmission rate is less than a low limit; and
  based on the retransmission rate being less than the low limit, retransmit the second video packet.

16. The CRM of claim 11, wherein the instructions that cause the processor to selectively retransmit the second video packet in response to the non-receipt of the ACK packet, further includes instructions that cause the processor to:
  determine whether the third video packet has been previously retransmitted;
  based on the third video packet not having been previously retransmitted, retransmit the third video packet; and
  based on the third video packet having been previously retransmitted, determine whether the third video packet is the oldest video packet in the buffer.

17. The CRM of claim 16, further including instructions that, when executed by the processor, cause the processor to:
  based on the third video packet not being the oldest video packet in the buffer, determine whether the buffer level is above the second threshold;
  based on the buffer level being above the second threshold, determine whether the retransmission rate is less than a low limit; and
  based on the retransmission rate being less than the low limit, retransmit the second video packet.

18. The CRM of claim 16, further including instructions that, when executed by the processor, cause the processor to:
  based on the third video packet being the oldest video packet in the buffer, determine whether three retransmission timeouts have occurred for the third video packet;
  based on the three retransmission timeouts having occurred, determine whether the buffer is above a first threshold;
  based on the buffer being above the first threshold, determine whether the retransmission rate is less than the high limit; and
  based on the retransmission rate being less than the high limit, retransmit the third video packet.

* * * * *